US009446490B2

(12) United States Patent
Onose et al.

(10) Patent No.: US 9,446,490 B2
(45) Date of Patent: Sep. 20, 2016

(54) METHOD OF FRICTION WELDING AND APPARATUS OF FRICTION WELDING

(75) Inventors: Ryo Onose, Hadano (JP); Takehiro Okuno, Hadano (JP)

(73) Assignee: NITTAN VALVE CO., LTD., Hadano-shi (JP)

( * ) Notice: Subject to any disclaimer, the term of this patent is extended or adjusted under 35 U.S.C. 154(b) by 97 days.

(21) Appl. No.: 14/008,477

(22) PCT Filed: Jul. 13, 2012

(86) PCT No.: PCT/JP2012/067941
§ 371 (c)(1),
(2), (4) Date: Sep. 27, 2013

(87) PCT Pub. No.: WO2014/010081
PCT Pub. Date: Jan. 16, 2014

(65) Prior Publication Data
US 2015/0136304 A1   May 21, 2015

(51) Int. Cl.
| | | |
|---|---|---|
| *B32B 41/00* | (2006.01) | |
| *B23Q 15/22* | (2006.01) | |
| *B23Q 15/02* | (2006.01) | |
| *B23K 20/12* | (2006.01) | |
| *B29C 65/06* | (2006.01) | |
| *B29C 65/00* | (2006.01) | |

(52) U.S. Cl.
CPC .......... *B23Q 15/225* (2013.01); *B23K 20/121* (2013.01); *B23Q 15/02* (2013.01); *B29C 65/0609* (2013.01); *B29C 66/934* (2013.01); *G05B 2219/45146* (2013.01)

(58) Field of Classification Search
CPC ...... B23K 20/12; B23K 26/20; B29C 65/06; B29C 65/0672; B29C 65/645; B29C 66/90; B29C 66/92; B23Q 17/22; B23Q 17/2428
USPC ........... 156/73.5, 64, 350, 360, 378, 379
See application file for complete search history.

(56) References Cited

U.S. PATENT DOCUMENTS 3,542,274 A * 11/1970 Miller ........................ 228/2.3
3,998,373 A * 12/1976 Jones et al. ................. 228/2.3
(Continued)

FOREIGN PATENT DOCUMENTS

| JP | 06-99290 A | 4/1994 |
| JP | 07-185842 A | 7/1995 |

(Continued)

OTHER PUBLICATIONS

Internaional Search Report dated Oct. 16, 2012, issued in corresponding application No. PCT/JP2012/067941.
(Continued)

*Primary Examiner* — Michael N Orlando
*Assistant Examiner* — Joshel Rivera
(74) *Attorney, Agent, or Firm* — Westerman, Hattori, Daniels & Adrian, LLP

(57) ABSTRACT

To provide a method of friction welding and an apparatus of friction welding in which a length of time for manufacturing one product is reduced as much as possible regardless of the dimension errors of works. The fast forwarding distance Lx1 is calculated for the fast forwarding by using the results of measuring the dimensions of works W1, W2 under the condition of the constant slowly forwarding distance Lx2, Thereby, for the work of a legitimate dimension and even for the work having a dimension smaller than the legitimate dimension, the elongation of the slowly forwarding distance is prevented compared with the work having the longer dimension than the legitimate dimension, and the relative proportion of the fast forwarding distance Lx1 is increased by making shorter the specified slowly forwarding distance.

19 Claims, 14 Drawing Sheets

(56) References Cited

U.S. PATENT DOCUMENTS

| | | | |
|---|---|---|---|
| 4,606,489 A * | 8/1986 | Steinhart et al. | 228/102 |
| 5,858,142 A * | 1/1999 | Tully et al. | 156/73.5 |
| 2006/0196916 A1* | 9/2006 | Goldstein et al. | 228/114.5 |

FOREIGN PATENT DOCUMENTS

| | | |
|---|---|---|
| JP | 09-47885 A | 2/1997 |
| JP | 09-141454 A | 6/1997 |
| JP | 09-285879 A | 11/1997 |
| JP | 10-20911 A | 1/1998 |
| JP | 10-118777 A | 5/1998 |
| JP | 10-216963 A | 8/1998 |
| JP | 2000-176656 A | 6/2000 |
| JP | 2001-248602 A | 9/2001 |
| JP | 2005-199390 A | 7/2005 |

OTHER PUBLICATIONS

Written Opinion dated Oct. 16, 2012, corresponding application No. PCT/JP2012/067941; with English translation.

* cited by examiner

METHOD OF FRICTION WELDING AND APPARATUS OF FRICTION WELDING

TECHNICAL FIELD

The present invention relates to a method of friction welding and an apparatus of friction welding

BACKGROUND ART

Patent Publication 1 describes a well-known method of friction welding for bonding a pair of works. This method consists of relatively rotating the pair of the works while the end surfaces of the works are in contact with each other to generate friction heat on the end surfaces, and then applying an upset pressure for producing an interatomic attraction for integrating the pair of the works. This method eliminates the necessities of supplying a heat source other than the friction heat and of the use of a welding rod and flux.

Generally, in this method, before a first work gets in contact with a second work, the second work is moved (fast forwarded) from a specified moving start position toward the first work for a specified distance (fast forwarding distance) while the first work is rotated under fixation. Then, for achieving the contact between the pair of the works without the damages of the works and a processing machine, the second work is moved (slowly forwarded) toward the first work at a forwarding speed (hereinafter referred to as "slowly forwarding speed") slower than the forwarding speed during the fast forwarding (hereinafter referred to as "fast forwarding speed"), thereby contacting the second work to the first work.

A dimension error possibly existing in the work generates a threat that the send work impacts the first work not during the slow forwarding but during the fast forwarding. In order to avoid this occurrence, the slowly forwarding distance is set longer when the work dimension is legitimate in consideration that the work dimension is made longer than the legitimate dimension due to the dimension error under the assumption of the second work is fast forwarded from the specified moving start position toward the first work for the specified distance (fast forwarding distance) (The slowly forwarding distance is set as the total of "anticipated maximum dimension error when it is made longer than the legitimate dimensions for both of the works"+"a moving distance at the slowly forwarding speed in the above case") (refer and compare a first case when the dimension is legitimate with a second case when the dimension is longer than the legitimate in FIG. 4).

PRIOR TECHNICAL PUBLICATION

Patent Publication

Patent Publication 1: Japanese Patent Publication Gazette No. 9-47885

SUMMARY OF INVENTION

Problems to be Solved by Invention

When the slowly forwarding distance for the legitimate work dimension is set longer in consideration that the work dimension is made longer than the legitimate dimension due to the dimension error such that the second work does not impact the first work during the fast forwarding stage as described earlier, the slowly forwarding distance is made longer for the work of the legitimate dimension and the work having the dimension shorter than the legitimate dimension (refer to FIG. 4) so that a period of time required for fabrication of one product (cycle time (time/product)) is prolonged, thereby reducing the productivity.

The present invention has been made in consideration of the above subjects. A first object thereof is to provide a method of friction welding in which a period of time required for the fabrication of one product is reduced as much as possible regardless of the dimension error of the work.

A second object is to provide an apparatus of friction welding employed for the above method of friction welding.

Means of Solving Problems

The present invention (invention of claim 1) for achieving the first object has the configuration of:

a method of friction welding in which a first work and a second work approach each other for their bonding by means of a fast forwarding aspect and a slowly forwarding aspect of which a slowing forwarding speed is slower than that of the fast forwarding aspect, and which follows the fast forwarding aspect, the method comprising the steps of:

measuring a dimension of at least one of the first work and the second work;

calculating a fast forwarding distance for the fast forwarding aspect by using a result of the measured dimension of the work under a condition of a constant slowly forwarding distance for the slowly forwarding aspect; and executing the fast forwarding aspect for the fast forwarding distance.

Preferred embodiments of claim 1 are as described in claims 2 to 8.

The present invention (invention of claim 9) for achieving the second object has the configuration of:

an apparatus of friction welding in which a first work and a second work approach each other for their bonding by means of a fast forwarding aspect and a slowly forwarding aspect of which a slowing forwarding speed is slower than that of the fast forwarding aspect, and which follows the fast forwarding aspect, the apparatus comprising:

a length measuring unit which measures a work dimension of at least one of the first work and the second work;

first and second holding devices which are positioned in a relatively-approachable fashion and hold the first work and the second work, respectively; and a control unit which generates the relative approach between the second holding device and the first holding device for the fast forwarding distance in the fast forwarding aspect by calculating the fast forwarding distance for the fast forwarding aspect based on the measured results of the length measuring unit under a condition of the constant slowly forwarding distance for the slowly forwarding aspect.

Preferred embodiments of claim 9 are as described in claim 10 and thereafter.

Effects of Invention

In accordance with the present invention (invention of claim 1), since the fast forwarding aspect is executed for the fast forwarding distance by calculating the fast forwarding distance for the fast forwarding aspect by means of using at least one of the dimension measured results for the first work and the second work under the condition of the constant slowly forwarding distance for the slow forwarding, the relative proportion of the fast forwarding distance can be increased by shortening the slowly forwarding distance to be executed by means of shortening the slowly forwarding distance as much as possible even if the dimension error is generated between the pair of the works. Therefore, a length of time (cycle time (time/product)) required for the manufacture of one product can be reduced regardless of the dimension error of the work, thereby increasing the productivity.

In accordance with the invention of claim 2, since the dimensions of the first work and the second are measured, and the fast forwarding distance for the fast forwarding aspect is calculated by using the results of the measured dimensions of the both works under the condition of the constant slowly forwarding distance for the slowly forwarding aspect, for the work of a legitimate dimension and even for the work having a dimension smaller than the legitimate dimension, the elongation of the slowly forwarding distance is prevented compared with the work having the longer dimension than the legitimate dimension, and the relative proportion of the fast forwarding distance is increased by making shorter the specified slowly forwarding distance. Accordingly, the length of time (cycle time (time/product)) required for the manufacture of one product can be further reduced.

In accordance with the invention of claim 3, since the speed of the slowly forwarding aspect is decelerated lower than the steady speed of the slowly forwarding aspect, for the contact between the first work and the second work, the damage of the work can be prevented with further assurance compared with the case of the steady speed of the slowly forwarding aspect at the time of the contact between the first work and the second work.

In accordance with the invention of claim 4, since the first work and the second work are relatively rotated by using the for the bonding between the first work and the second work, and the rotation driving source is activated after the start point of the fast forwarding aspect and at least before the activation start point of the rotation driving source which makes the relatively rotation state the steady state by the end point of the slowly forwarding aspect, the timing of activating the rotation driving source can be delayed without arising a new problem with regard to the relative rotation state (friction welding). Therefore, the power consumption of the rotation driving source can be suppressed as much as possible while the proper relative rotation is secured.

In accordance with the invention of claim 5, since the activation start point of the rotation driving source is calculated based on the start point of the slowly forwarding aspect as the reference, it can be judged that no problem arises in the rotation drive state (steady state) of the rotation driving source when what extent the rotation activation start point of the rotation driving source is established taking the slowly forwarding start point as the reference point by utilizing the fact that the slowly forwarding start point is always located at the constant position based on the fact that the slowly forwarding distance has a specified value (constant value) even if the dimension error exists in the work. Accordingly, by utilizing the slowly forwarding start point, the rotation driving source can be activated at the timing as late as possible with assuredness (elevation of suppression of power consumption).

In accordance with the invention of claim 6, since the dimension of the first work is deemed to be the total between its legitimate length and the safety additional dimension while the dimension of the second work is measured, and the fast forwarding distance for the fast forwarding aspect is calculated by using results of the deemed dimension of the first work and the measured dimension of the second work under the condition of the constant slowly forwarding distance for the slowly forwarding aspect, the relative proportion of the fast forwarding distance is increased by shortening the slowly forwarding to be actually executed by means of shortening the specified slowly forwarding distance as much as possible even if any dimension error exists in the both works. Also, in this case, regardless of the dimension error of the work, the length of time (cycle time (time/product)) required for the manufacture of one product can be reduced, thereby increasing the productivity.

Further, the required length-measuring device can be made simpler because the dimension of only the second work is measured.

In accordance with the invention of claim 7, since the execution of the slowly forwarding aspect continues even if this aspect exceeds the above specified slowly forwarding distance, and, on the other hand, the slowly forwarding aspect is completed when the first work gets in contact with the second work, the secure contact between the first work and the second work under the slowly forwarding aspect completes the slowly forwarding aspect so that the assuredness of the damage prevention of the work can be increased, and the migration to the next step can be smoothly performed.

In accordance with the invention of claim 8, since only the work having the measured dimension value in the permitted range based on the dimension measured results of the works is made into the target work, not only the slowly forwarding distance is properly established to the short constant distance by adjusting the constant forwarding distance based on the work dimension, but also the bonding position (product position) between the first work and the second work can be appropriately located in a specified range for increasing the product quality.

In accordance with the invention of claim 9, since the apparatus includes the length measuring unit which measures a work dimension of at least one of the first work and the second work, the first and second holding devices which are positioned in the relatively-approachable fashion and hold the first work and the second work, respectively, and the control unit which generates the relative approach between the second holding device and the first holding device for the fast forwarding distance in the fast forwarding aspect by calculating the fast forwarding distance for the fast forwarding aspect based on the measured results of the length measuring unit under the condition of the constant slowly forwarding distance for the slowly forwarding aspect, the dimension of at least one of the first work and the second work is measured, and the fast forwarding distance for the fast forwarding aspect is calculated under the condition of the constant slowly forwarding distance for the slowly forwarding aspect by using the dimension-measured results of the work so that the fast forwarding aspect can be executed for the fast forwarding distance. Accordingly, the apparatus of friction welding can be provided employing the method of friction welding of claim 1.

In accordance with the invention of claim 10, since the length measuring units are mounted for measuring the respective dimensions of the first work and the second work, the dimensions of the first work and the second are measured, and the fast forwarding distance for the fast forwarding aspect is calculated by using the results of the measured dimensions of both of the first work and the second work under the condition of the constant slowly forwarding distance for the slowly forwarding aspect. Accordingly, the apparatus of friction welding can be provided employing the method of friction welding of claim 2.

In accordance with the invention of claim 11, since the control means is mounted so as to make the speed of the slowly forwarding aspect into the deceleration speed slower than the steady speed of the slowly forwarding aspect for the contact between the first work and the second work, the damage of the work can be prevented with further assurance compared with the case of the steady speed of the slowly forwarding aspect at the time of the contact between the first work and the second work. The apparatus of friction welding can be provided employing the method of friction welding of claim 3.

In accordance with the invention of claim 12, since the first holding device includes a rotation driving source for rotating the first work, and the control unit is mounted such that the rotation driving source is activated after a start point of the fast forwarding aspect and at least before an activation start point of the rotation driving source which makes the relatively rotation state of the rotation driving source into a steady state by an end point of the slowly forwarding aspect, the timing of activating the rotation driving source can be delayed without arising a problem of the relatively rotating state. Accordingly, the power consumption of the rotation driving source can be reduced as much as possible while the proper relative rotation is secured.

In accordance with the invention of claim 13, since the control means is mounted such that the activation start point of the rotation driving source is calculated based on the start point of the slowly forwarding aspect as the reference, the rotation driving source can be activated at the timing as late as possible with assuredness. The apparatus of friction welding can be provided employing the method of friction welding of claim 5.

In accordance with the invention of claim 14, since the length measuring unit is mounted to measure the dimension of the second work, the first holding device is mounted to hold the first work, the second holding device is mounted to hold the second work, the control unit deems the dimension of the first work to be a total between its legitimate length and a safety additional dimension, and the fast forwarding distance for the fast forwarding aspect is calculated by using results of the deemed dimension of the first work and the measured dimension of the second work under the condition of the constant slowly forwarding distance for the slowly forwarding aspect so that the second holding device and the first holding device approach each other for the fast forwarding distance in the fast forwarding aspect, the relative proportion of the fast forwarding distance can be increased by reducing the slowly forwarding distance to be actually executed by means of reducing the specified slowly forwarding distance as much as possible even if the dimension error is generated in both of the works. The apparatus of friction welding can be provided employing the method of friction welding of claim 6.

In accordance with the invention of claim 15, since the contact detection means is mounted for detecting the contact between the first work and the second work, and the control means including the calculation means of calculating the fast forwarding distance for the fast forwarding aspect based on the dimension measurement results of the first work and the second work under the condition of the constant slowly forwarding distance for the slowly forwarding aspect, the establish means which establishes the execution distance for executing the slowly forwarding aspect which is deemed to continue exceeding the specified slowly forwarding distance together with establishing the execution distance for executing the fast forwarding aspect as the fast forwarding distance based on the calculation results of the calculation means, the execution section executing the relative approach between the second holding means and the first holding means based on the establishment of the establish means, and the changing means for completing the execution of the slowly forwarding aspect by means of changing the established content in the establish means when the first work and the second work are judged to be in contact with each other based on the detection results of the above contact detection means, the first work and the second work can be securely in contact with each other under the slowly forwarding aspect to complete the slowly forwarding aspect assuredly so that the assuredness of damage prevention of the work is increased and the migration to the next step can be smoothly performed. The apparatus of friction welding can be provided employing the method of friction welding of claim 7.

EMBODIMENTS FOR IMPLEMENTING INVENTION

Embodiments of the present invention will be hereinafter described referring to the annexed drawings.

First Embodiment

Figure 1:
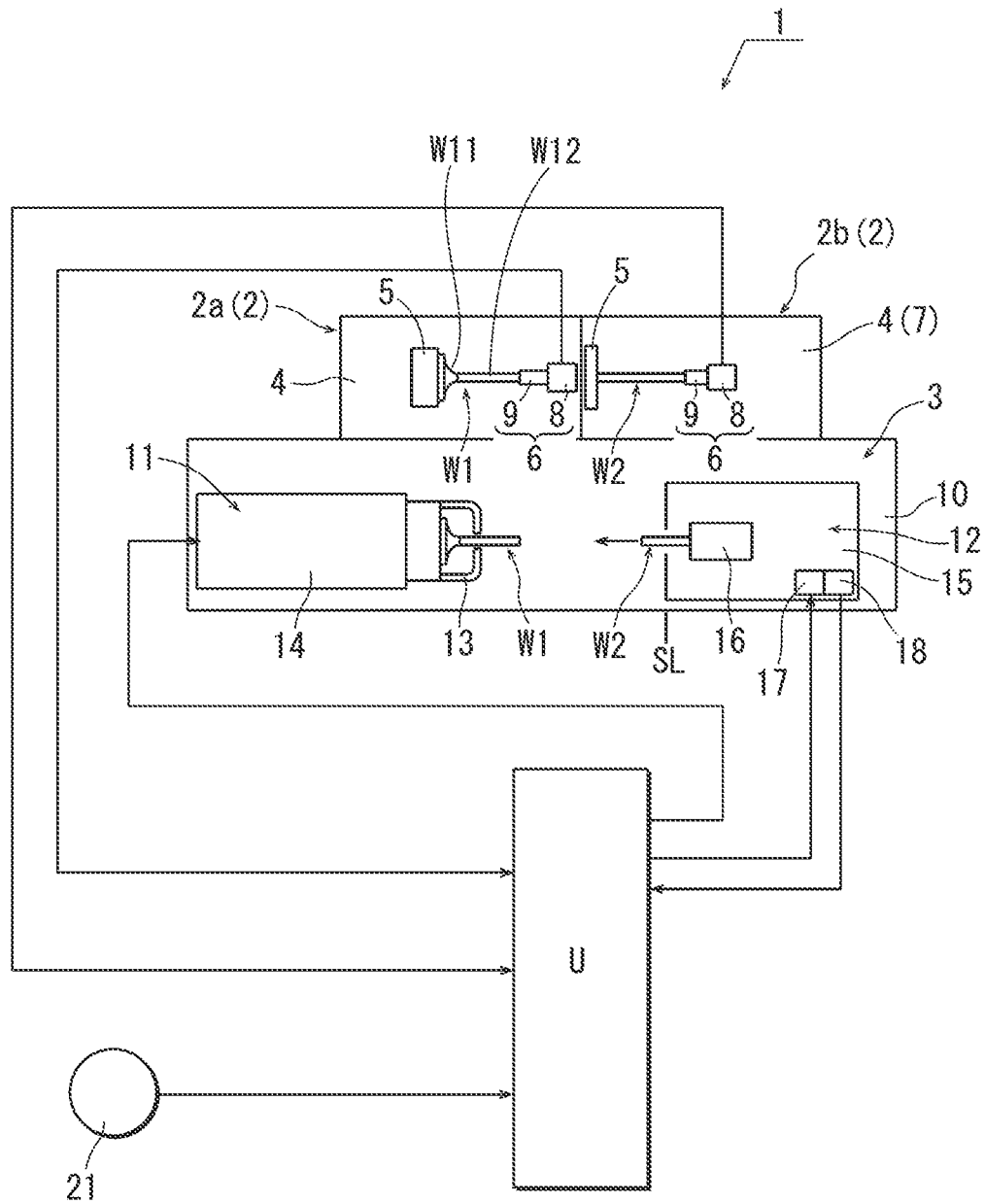
FIG. 1 An entire configuration showing a first embodiment.

In FIG. 1, a numeral 1 designates an apparatus of friction welding for executing a method of friction welding of a first embodiment. The apparatus 1 includes a length measuring device 2 which measures the respective entire lengths of a first work W1 and a second work W2 ("W" is used for collectively designating both of the works), and a bonding device 3 integrating the works W1 and W2 by means of the friction welding. Both of the devices are positioned adjacently.

In the present invention, an head-shaped element (the W1 is also used for specifically designating the head-shaped element) is employed for the first work W1, and a shaft-shaped element (the symbol W2 is also used for specifically designating the shaft-shaped element) is employed for the second work W2. The head-shaped element acting as the first work W1 includes a valve section W11 and a shaft section W12 integrally extending from the valve section W11, and the element acting as the second work W2 is shaft-shaped. These works configure an engine valve by integrally bonding the shaft section W12 of the head-shaped element W1 and the shaft-shaped element W2.

In the present embodiment, as shown in FIG. 1, a pair of the length measuring devices 2 having the basically same configuration are mounted. The pair of the length measuring devices 2 are positioned in series. The first length measuring device 2a measures the entire length of the first work W1 (the entire length of the shaft section W12 extending along the shaft center), and the second length measuring device 2b measures the entire length of the second work W2 (the entire length of the shaft-shaped element W2 along the extending direction).

As shown in FIG. 1, the respective length measuring devices 2 include measuring stands 4, stoppers 5 and length measuring units 6.

The measuring stand 4 has a flat placing surface 7 on its top surface for placing the work W. The surface is formed as a rectangular surface sufficiently extending for placing the work W.

The stopper 5 is mounted at one end of the longitudinal direction on the placing surface 7 of the measuring stand 4 (left-hand side in FIG. 1). The stopper 5 is mounted perpendicular to the placing surface 7, and the inner flat surface of the stopper faces inward toward the longitudinal direction of the measuring stand 4.

The length measuring unit 6 is mounted at the other end of the longitudinal direction on the placing surface 7 of the measuring stand 4 (right-hand side in FIG. 1). The length measuring unit 6 includes a main section 8 and a measuring head 9 which projects form the main section 8 toward the stopper 5 and recedes from the projected position. The measuring head 9 projects such that the work is sandwiched between the front end of the head 9 and the inner surface of the stopper 5, and an amount of the projection changes depending on the dimension of the work W. The main section 8 detects the conditions of setting (mounting) the work W together with distance between the front end of the head 9 and the inner surface of the stopper 5 as the dimension of the work (L1 or L2) by using the amount of the projection of the measuring head 9, and the detection results are output. During the detection, the shaft-shaped element W2 (second work W2) is supported on a receiving element (not shown) in the shape of a V-block on the placing surface 7 of the measuring stand 4, and the head-shaped element W22 acting as the first work W2 is lightly grasped by using an air-operated chuck (not shown) of the length measuring device 2a.

Figure 2:
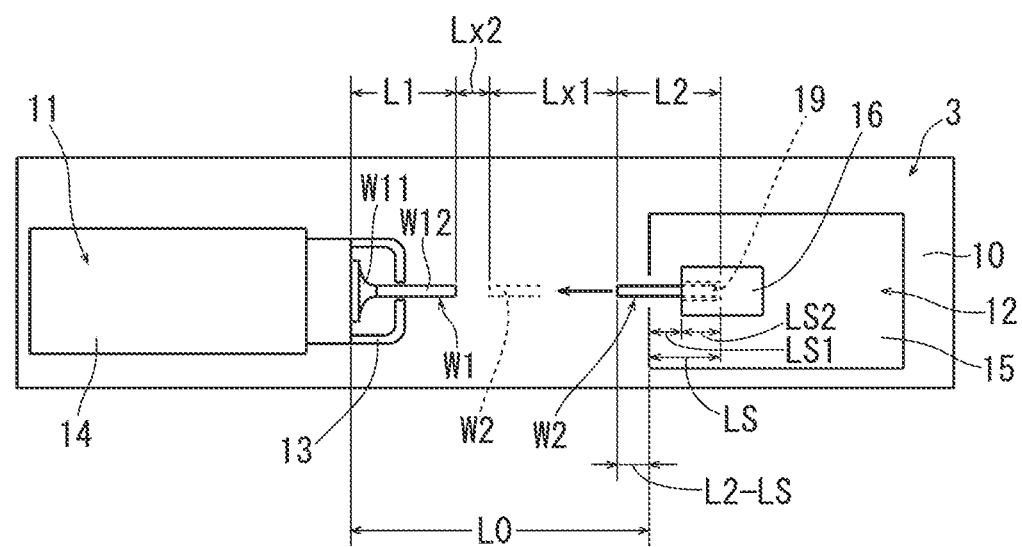
FIG. 2 An explanatory diagram showing a slowly forwarding distance, a fast forwarding distance, a work dimension and so on in the bonding apparatus of the first embodiment.

As shown in FIG. 1 and FIG. 2, the bonding device 3 includes a main frame 10, a spindle device 11 acting as a first holding device and a slider device 12 acting as a second holding device.

The main frame 10 extends along the direction of mounting the measuring stand 4 (horizontal direction in FIG. 1) at one side of the measuring stand 4 along its width direction (bottom side in FIG. 1). The main frame 10 has a length sufficiently longer than the longitudinal lengths of the pair of the measuring stands 4, and has a flat top surface.

The spindle device 11 is mounted at one end of the longitudinal direction on the top surface of the main frame 10. The spindle device 11 includes a chucking section 13 which, at the inner side along the longitudinal direction of the main frame 10, chucks the umbrella-shaped shaft section W12 acting as the first work W1. The chucking section 13 is driven to be rotated by a rotation driving source 14 possessed by the spindle device 11. When the shaft section W12 of the head-shaped element W1 is chucked to the chucking section 13, the shaft section W12 extends from the chucking section 13 farther than the valve section W11.

The slider device 12 is mounted at the other end of the longitudinal direction on the top surface of the main frame 10. The slider device 12 includes a slider stand 15 and a chucking section 16 integrally mounted thereon.

The slider stand 15 can approach to and is remote from the spindle device 11 by employing a known ball screw mechanism (not shown). The ball screw mechanism is related with a drive motor 17 which is then related to an encoder 18 detecting the rotating condition of the drive motor 17. In the slider stand 15, a sliding start position (waiting position) SL is determined in advance (refer to FIG. 1). When the operation of friction welding starts, the slider stand slides from the sliding start position SL toward the spindle device 11. When the slider stand 15 is at the sliding start position (waiting position) SL, the distance from the front end surface of the slider stand 15 to the supporting surface of the chucking section 13 of the spindle device 11 is determined in advance as "L0" (refer to FIG. 2).

As shown in FIG. 2, the chucking section 16 chucks (holds) the second shaft-shaped work W2 while partly receiving the work W2. The chucking section 16 is situated at a position inwardly receded from the front end of the slider stand 15 (left-hand end in FIG. 2), and the distance from the front end surface of the slider stand 15 to the front end of the chucking section 16 is determined in advance as "LS1" (refer to FIG. 2). As shown in FIG. 2, an collet chuck 19 for receiving the shaft-shaped element W2 is open on the front end surface of the chucking section 16 for holding the element W2. The collet chuck 19 is formed in an enlarging and reducing fashion by using a plurality of circumferential members, and the shaft-shaped element W2 is firmly chucked in the collet chuck 19 by reducing the collet chuck size of the plurality of the circumferential members by means of a size-reducing means not shown in the drawings. In this case, the length LS2 of the collet chuck 19 along the direction of the shaft center is constant for the proper holding. When the shaft-shaped element W2 is correctly chucked in the collet chuck 19, the shaft-shaped element W2 projects from the front end of the slider stand 15 toward the inward along the longitudinal direction. An amount of the projection from the front end of the slider stand 15 is calculated as "L2-LS" by using LS1 and LS2 (the total of LS1 and LS2 is LS) when the entire length f the shaft-shaped element W2 is assumed.

Figure 9:
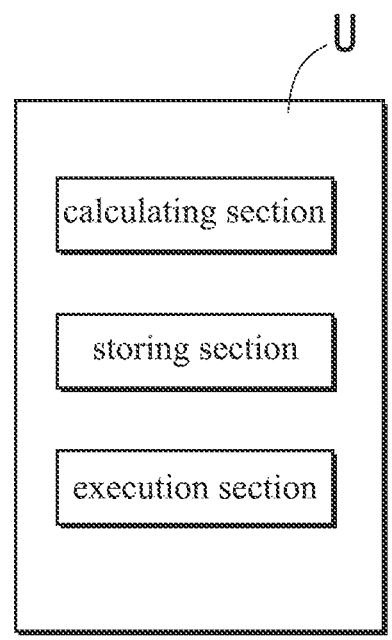
FIG. 9 An explanatory diagram showing the configuration of a control unit.

As shown in FIG. 1, the apparatus of friction welding 1 is controlled by the control unit U. As shown in FIG. 9, the control unit U includes a calculating section, a storing section and an execution section. As described later in detail, the calculating section has, in the forwarding embodiments of the second work W2 with respect to the first work W1 (fast forwarding embodiment (hereinafter referred to as "fast forwarding" and slowly forwarding embodiment (hereinafter referred to as "slow forwarding"), functions of calculating a fast forwarding distance Lx1 for the fast forwarding and calculating positions of changing points (P1 to P5 described later) of the drive motor 17, under the condition of the constant slowly forwarding distance Lx2 for the slow forwarding, by utilizing a value L1 of measured dimension of the first work W1, a value L2 of measured dimension of the second work W2 and a set value. The storing section has a function of storing the above values calculated in the calculating section, and the executing section has a function of reading the various values from the storing section and outputting them to external control devices.

While the various signals such as the set signal and the entire length signal of the work (head-shaped element) W1 from the length measuring unit 6, the set signal and the entire length signal of the work (shaft-shaped element) W2 from the length measuring unit 6, an encode signal from the slider device 12, and signals for chucking (holding) the works W1, W2 in the spindle device 11 and the slider device 12 coming from a group of sensors (collectively designated by a numeral 21) are input into the control unit U as shown in FIG. 1, a rotation drive signal and a drive signal are output to the rotation driving source 14 of the spindle device 11 and to the drive motor 17 of the slider stand 15, respectively, from the control unit U.

Figure 3:
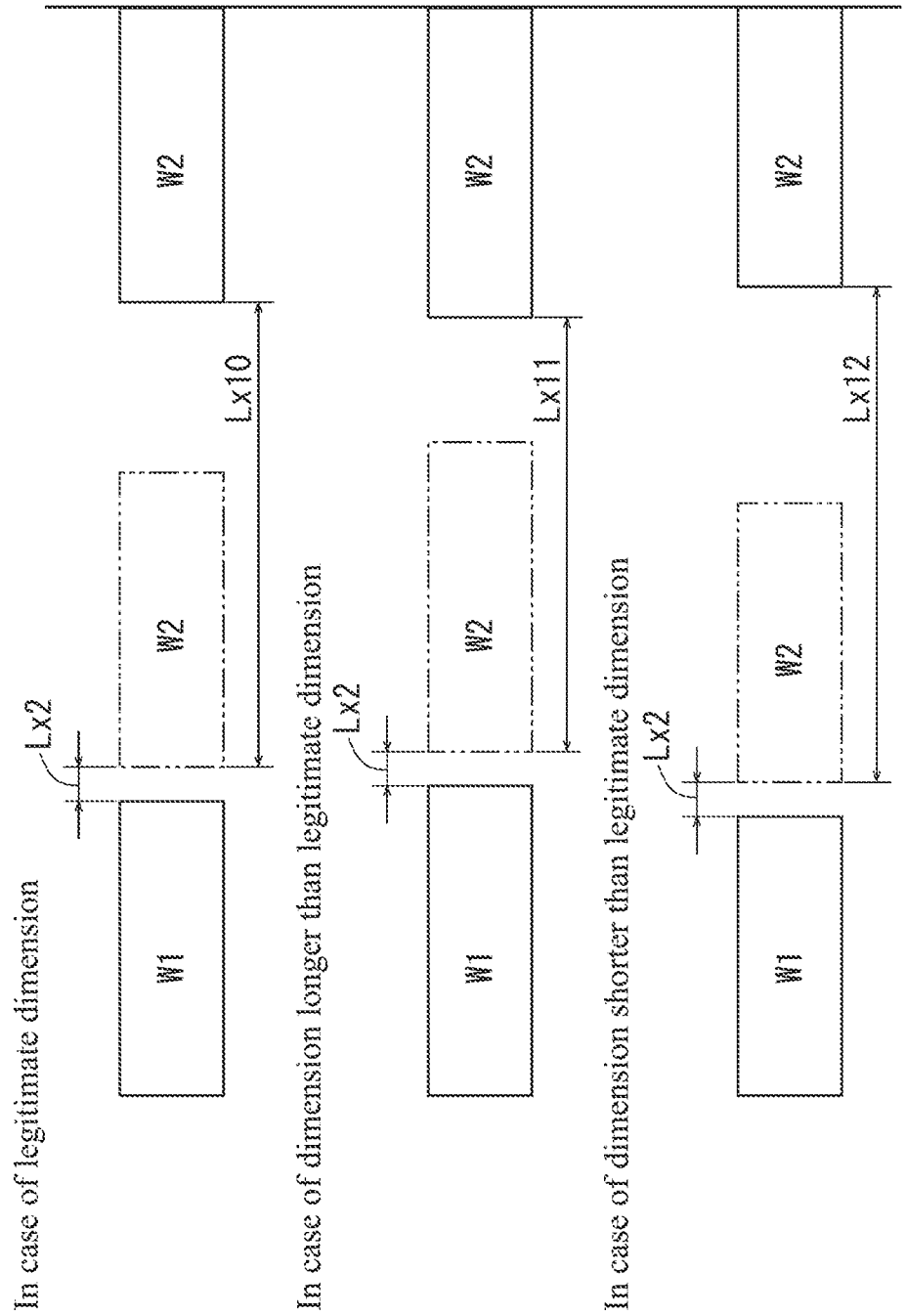
FIG. 3 An explanatory diagram conceptually showing the method of friction welding of the first embodiment.

The control unit U performs the control schematically shown in FIG. 3.

In the friction welding apparatus 1, the pair of the works W1, W2 are relatively rotated while the end surfaces of the works are in contact with each other, thereby generating friction heat on the contacted interfacial surfaces, and then an upset pressure is applied to produce an interatomic attraction for integrating the pair of works. As its previous stage, at the time of contacting the second work W2 to the first work W1, the second work W2 is fast forwarded for a specified distance (fast forwarding distance) Lx1 from a moving start position SL toward the first work W1 while the first work W1 is held (fixed) under rotation. Then, the second work W2 moves toward the first work W1 at the slowly forwarding speed slower than the fast forwarding speed during the fast forwarding. This procedure suppresses the damages to the works W1, W2 and to the processing device by contacting the works W1 and W2 with each other not during the fast forwarding stage but during the slowly forwarding stage even if the dimension errors may exist in the works W1, W2.

In this case, even if the dimension errors are generated in the work W (works W1, W2), the following operation is adapted to reduce the cycle time (time/product).

After the slowly forwarding distance Lx2 is set to a specified value (constant value) as short as possible in the range where no problem is given to the slow forwarding, a relational expression of L0=L1+Lx1+Lx2+L2−LS is obtained as apparent from FIG. 2 when the slowly forwarding distance Lx2, the entire length L1 of the first work (head-shaped element) W1 and the entire length L2 of the second work (shaft-shaped element) W2 measured by the respective length measuring devices 2, the distance L0 between the spindle device 11 and the slider stand 15 under the waiting, and the projection amount L2−LS (=L2−LS1−LS2) of the shaft-shaped element W2 from the slider stand 15 are used. Based on this relational expression, the fast forwarding distance Lx1 (Lx1=L0−L1−Lx2−L2+LS) can be calculated (Lx10, Lx11 and Lx12 in FIG. 3 can be calculated). As shown in FIG. 3, when the no dimension error exists in the dimension (entire length) of the work W (legitimate dimension), when the dimension of the work W is longer than the legitimate dimension, and when the dimension of the work W is shorter than the legitimate dimension, the fast forwarding distance Lx1 can be calculated to make the slowly forwarding distance Lx2 equal to the above specified value in each case. The movement of the slider stand 15 over the calculated fast forwarding distance Lx1 (Lx10, Lx11 and Lx12 in FIG. 3) from a fast forwarding start position LS always completes the fast forwarding leaving the specified slowly forwarding distance Lx2. Accordingly, if the specified value Lx2 is established to be a specified short distance, the relative proportion of the fast forwarding distance (fast forwarding) with respect to the slowly forwarding distance (slow forwarding) is increased without arising a new problem, thereby shortening the cycle time (time/product) to elevate the productivity.

In the present embodiment, when the pair of the works W1 and W2 are in contact with each other, not only the work W2 moves in the slowly forwarding speed but also the slowly forwarding speed is in a deceleration mode (concretely, when the works W1 and W2 are in contact with each other, the slowly forwarding speed is equal to zero) so that the damages of the works and the processing machine are avoided with further reliability.

Figure 4:
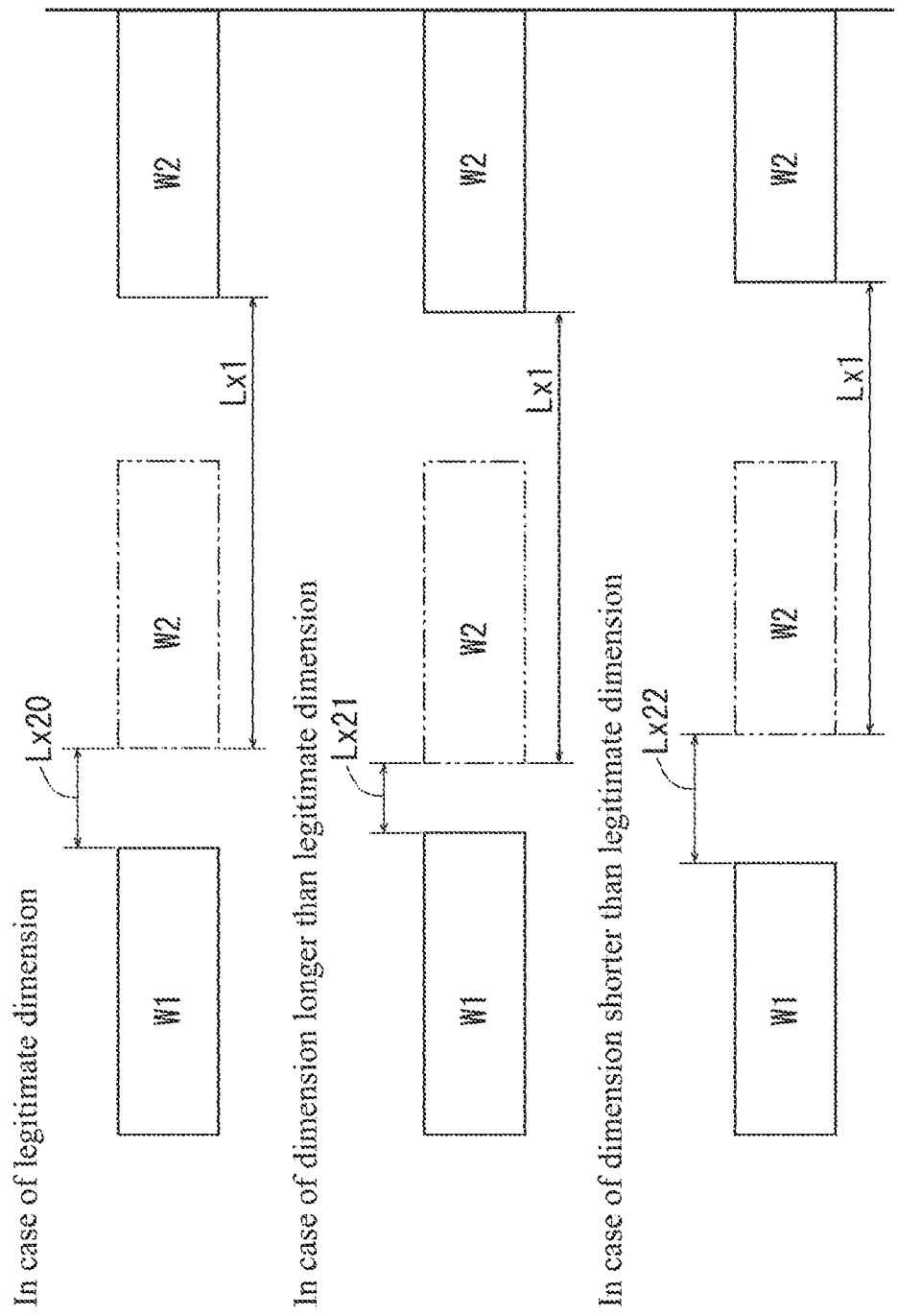
FIG. 4 An explanatory diagram conceptually showing the method of friction welding of prior art.

On the other hand, in the conventional method of friction welding shown in FIG. 4, the fast forwarding distance Lx1 is determined to be constant. Under this condition, even when the dimension of the work W is longer than the legitimate dimension due to an error, the slowly forwarding distance Lx21 is established assuredly (no collision takes place in the fast forwarding). Therefore, when the dimension of the work W is legitimate or shorter than the legitimate dimension, the slowly forwarding distance inevitably becomes Lx20 and Lx22 which are longer than the above Lx21 so that the cycle time (time/product) is prolonged not to elevate the productivity.

Figure 5:
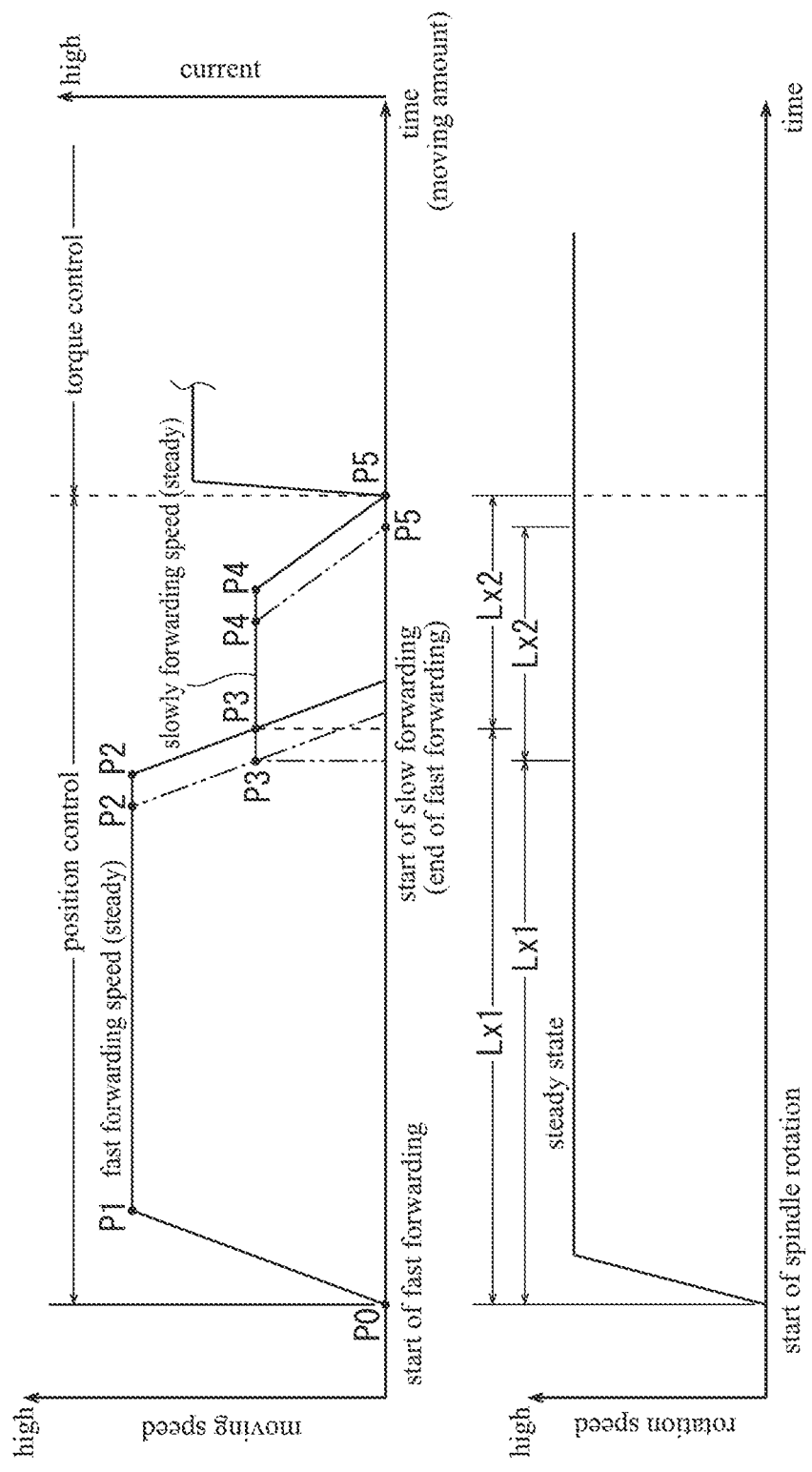
FIG. 5 An explanatory diagram showing the time course of the method of friction welding of the first embodiment.
Figure 6:
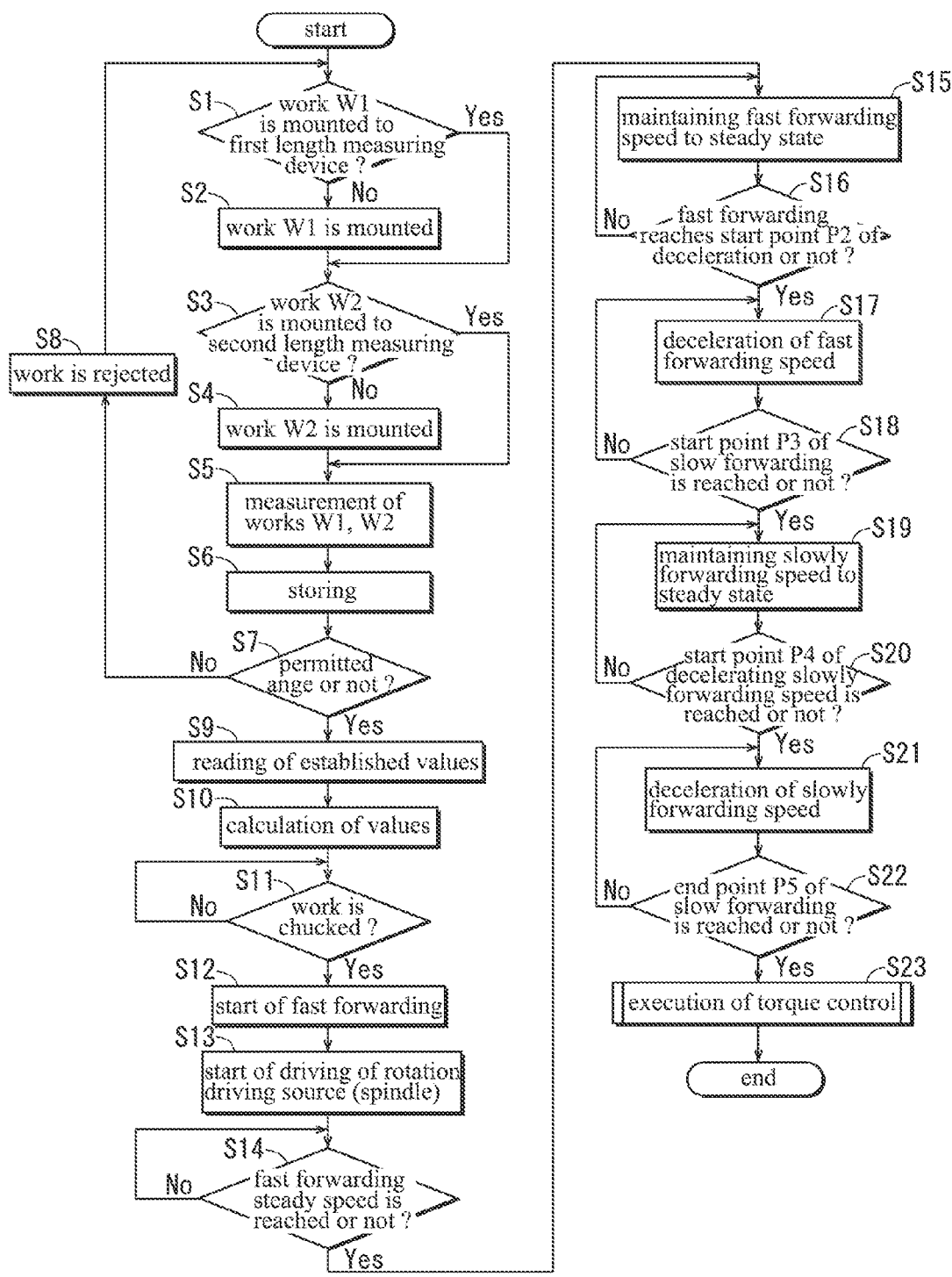
FIG. 6 A flowchart showing an example of control of the first embodiment.

An example of controlling the above control unit U will be specifically described together with the method of the friction welding in accordance with the present embodiments based on an explanatory diagram showing the time course of FIG. 5 and a flowchart of FIG. 6. In FIG. 6, "S" designates a step.

At first, in S1, whether or not the work W1 is mounted on the first length measuring device 2a is judged for obtaining judgment whether or not the dimension of the work W1 may be measured. When S1 is judged to be NO, a new work W1 is mounted on the first length measuring machine 2a in S2, and when S1 is judged to be YES, directly go to S3. In S3, whether or not the work W2 is mounted on the second length measuring device 2b is judged for obtaining judgment whether or not the dimension of the work W2 may be measured. When S3 is judged to be NO, a new work W2 is mounted on the second length measuring machine 2b in S4, and when S3 is judged to be YES, directly go to S5.

In S5, the entire length (dimension) of the first work W1 and the entire length (dimension) of the second work W2 are measured. The measurement results are used such that the dimension errors of the works W1 and W2 are utilized for the adjustment of the fast forwarding distance in order to make the slowly forwarding distance into a desired shorter specified value (constant value). These entire lengths of the works W1 and W2 are stored in the storing means in the next S6, and the judgment on whether or not the respective entire lengths of the works W1 and W2 are in a specified permitted range is conducted. These are conducted for properly adjusting the fast forwarding distance (fast forwarding end point) based on the dimensions of the works W1 and W2 to make the slowly forwarding distance into a specified shorter one, and for accurately positioning the bonding position between the works W1 and W2 in a specified region, thereby maintaining the higher product quality. When S7 is judged to be NO, the next step is not conducted because the work is not a subject to be processed, and the work W is rejected in S8 and then return to S1. In this case, a new work W is introduced and mounted to the length measuring machine 2 in place of the rejected work W. On the other hand, S7 is judged to be YES, an established value (predetermined value) for the friction welding is read in S9. The specific established values include the gap L0 between the spindle device 11 and the slider stand 15 under the waiting (non-operation), the slowly forwarding distance Lx2 and the length LS of the work W2 placed on the slider stand 15.

The fast forwarding distances Lx1 and the respective points P1 to P5 (moving amounts or lateral coordinates values) in FIG. 5 are calculated based on the entire lengths L1, L2 of the works W1 and W2 stored on S6 and the established values in S9 for determining standard values used in the following judgment steps. The fast forwarding distances Lx1 and the respective points P1 to P5 in FIG. 5 are concretely calculated as follows.

The fast forwarding distance Lx1 can be obtained in accordance with the previous expression (Lx1=L0−L1−Lx2−L2+LS) (refer to FIG. 2). Since the rising gradient of the drive motor 17 is determined in advance and it is comprehended that the established fast forwarding steady speed can be reached with how many moving amounts (or what moment the steady can be reached) from the start of the drive motor 17, the start point P1 of the fast forwarding steady speed can be calculated. With respect to the fast forwarding deceleration start point P2, the fast forwarding deceleration gradient of the drive motor 17 is determined in advance, the fast forward distance Lx1 can be calculated in consideration of the dimension error, and the slowly forwarding steady speed is the established value. The line passing through a coordinate value composed of the fast forwarding distance Lx1 and the slowly forwarding steady speed is obtained as a fast forwarding deceleration gradient line, and P2 is obtained from the intersection between the fast forwarding deceleration gradient line and the fast forwarding steady speed region line. A fast forwarding end point (slowly forwarding start point) P3 can be obtained from a fast forwarding start point P0, the fast forwarding distance Lx1 obtained from the above expression (Lx1=L0−L1−Lx2−L2+LS), and the above-mentioned fast forwarding deceleration gradient line. With respect to the slowly forwarding deceleration start point P4, the slowly forwarding deceleration gradient of the drive motor 17 is determined in advance, the slowly forwarding distance Lx2 is determined in advance, and the moving speed at the slowly forwarding end pint which is a final point of the slowly forwarding distance Lx2 is zero. The line passing through a coordinate value composed of the slowly forwarding distance Lx1 and the slowly forwarding steady speed of zero is obtained as a slowly forwarding deceleration gradient line, and P4 is obtained from the intersection between the deceleration gradient line and the slowly forwarding steady speed region line. A slowly forwarding end point P5 can be obtained from the fast forwarding start point P0, the fast forwarding distance Lx1 and the slowly forwarding distance Lx2.

The respective values are calculated in S10. After it is confirmed in S11 that the work (shaft-shaped section) W1 is chucked to the spindle device 11 and that the work (shaft-shaped element) W2 is chucked to the slider stand 15, the slider stand 15 moves towards the spindle device 11 at the fast forwarding speed to start the fast forwarding of the work W2 to the work W1. Then, in S13, the rotation driving source (spindle) of the spindle device 11 starts to rotate, and the work W1 rotates around its shaft center.

In S14, whether or not the start point of the steady fast forwarding P1 is reached (the moving speed of the slider stand 15 reaches the steady fast forwarding speed) is judged for conducting the fast forwarding of the work W2 at the established steady fast forwarding speed. When S14 is judged to be NO, the judgment in S14 is repeated, and on the other hand, the S14 is judged to be YES the fast forwarding is started while the steady fast forwarding speed is maintained.

In S16, whether or not the fast forwarding deceleration start point P2 is reached is judged for decelerating the fast forwarding speed at the proper timing to immediately bring its speed to the steady slowly forwarding speed at the fast forwarding end point P3 because it is necessary to place the fast forwarding end point P3 on the deceleration gradient line passing through the fast forwarding deceleration start point P2. When S16 is judged to be NO, then return to S15 for maintaining the steady speed. On the other hand, when S16 is judged to be YES, the fast forwarding speed is decelerated in S17. The deceleration gradient is established in advance, and as shown in FIG. 5, the fast forwarding speed is reduced with the constant deceleration gradient.

In S18, whether or not the slowly forwarding start point P3 is reached is judged for executing the slow forwarding for the slow forwarding distance (constant) Lx2 having a specified value. When S18 is judged to be NO, return to S17 for continuing the deceleration of the fast forwarding. On the other hand, when S18 is judged to be YES, the slow forwarding is executed taking the speed at this moment as the slowly forwarding speed (constant) in S18.

In this case, the fast forwarding distance Lx1 changes due to the dimension error of the works W (refer to S10) so that the slowly forwarding start point P3 also changes for securing the slow forwarding distance Lx2 as the specified value (constant value) even if the dimension error exists (refer to a virtual line in FIG. 5).

In S20, whether or not the slowly forwarding deceleration start point P4 is reached is judged for completing the speed control (move control) by appropriately executing the slow forward, or for specifying the slowly forwarding end point P5 and the slowly forwarding speed (=0) on the slowly forwarding deceleration gradient line (the slowly forwarding deceleration start point P4 and the slowly forwarding speed (=0) are required to place on the deceleration gradient line passing through the slowly forwarding deceleration start point P4. Therefore, when S20 is judged to be NO, return to S19 for continuing the slow forwarding under the steady state slowly forwarding speed. On the other hand, S20 is judged to be YES, the deceleration of the slowly forwarding speed starts in S21. Then, in S22, whether or not the slowly forwarding end point P5 is reached is judged for assuredly conducting the slow forwarding for the specified slowly forwarding distance without fail and for preventing as much as possible the damages generated by the contact between the works W by means of the deceleration of the slowly forwarding speed (the slowly forwarding speed=0 in the present embodiment). When S22 is judged to be YES, in S23, the work W1 and the work W2 are relatively rotated under a certain torque with the works W1 and W2 being in contact with each other for the friction welding (generation of friction heat), and then a known method of the friction welding (such as application of upset pressure) is conducted for bonding the work (head-shaped element) W1 and the work (shaft-shaped element) W2 (execution of torque control). Thereby, the engine valve is obtained.

When S22 is judged to be YES, the work W1 and the work W2 are basically in contact with each other for immediately conducting the above torque control. However, for more accurately executing the torque control, the detection, by means of the current change of the drive motor 17, of the actual contact between the works W1 and W2 can be made the activation condition of the torque control (present control). In such a case, the slow move of the work W2 (slider stand 15) towards the work W1 at the slow speed by the driving of the drive motor 17 at a lower drive current under the condition of S22 to be judged YES prepares the actual control between the works W1 and W2.

Figure 7:
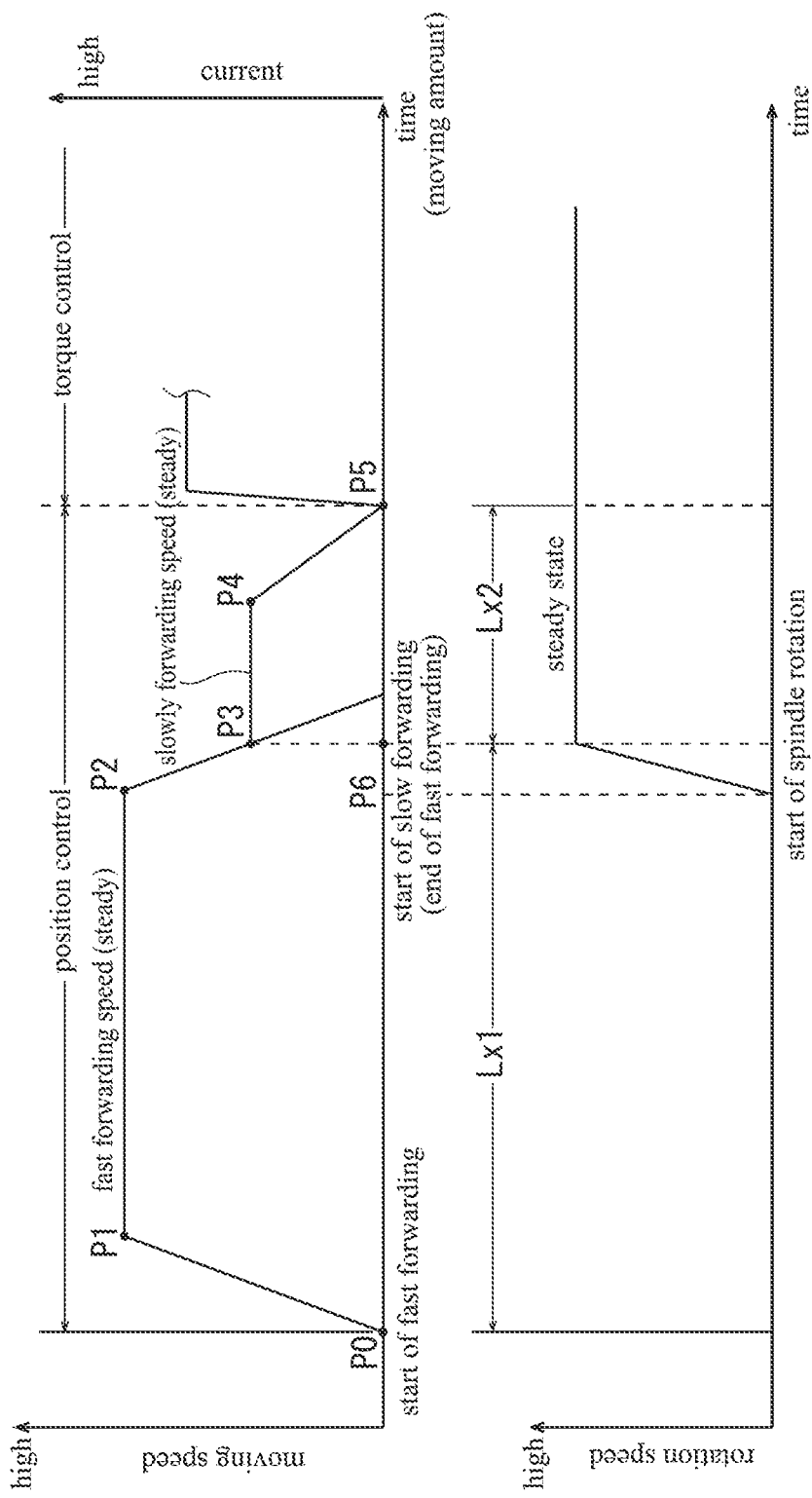
FIG. 7 An explanatory diagram showing the time course of the method of friction welding of a second embodiment.
Figure 8:
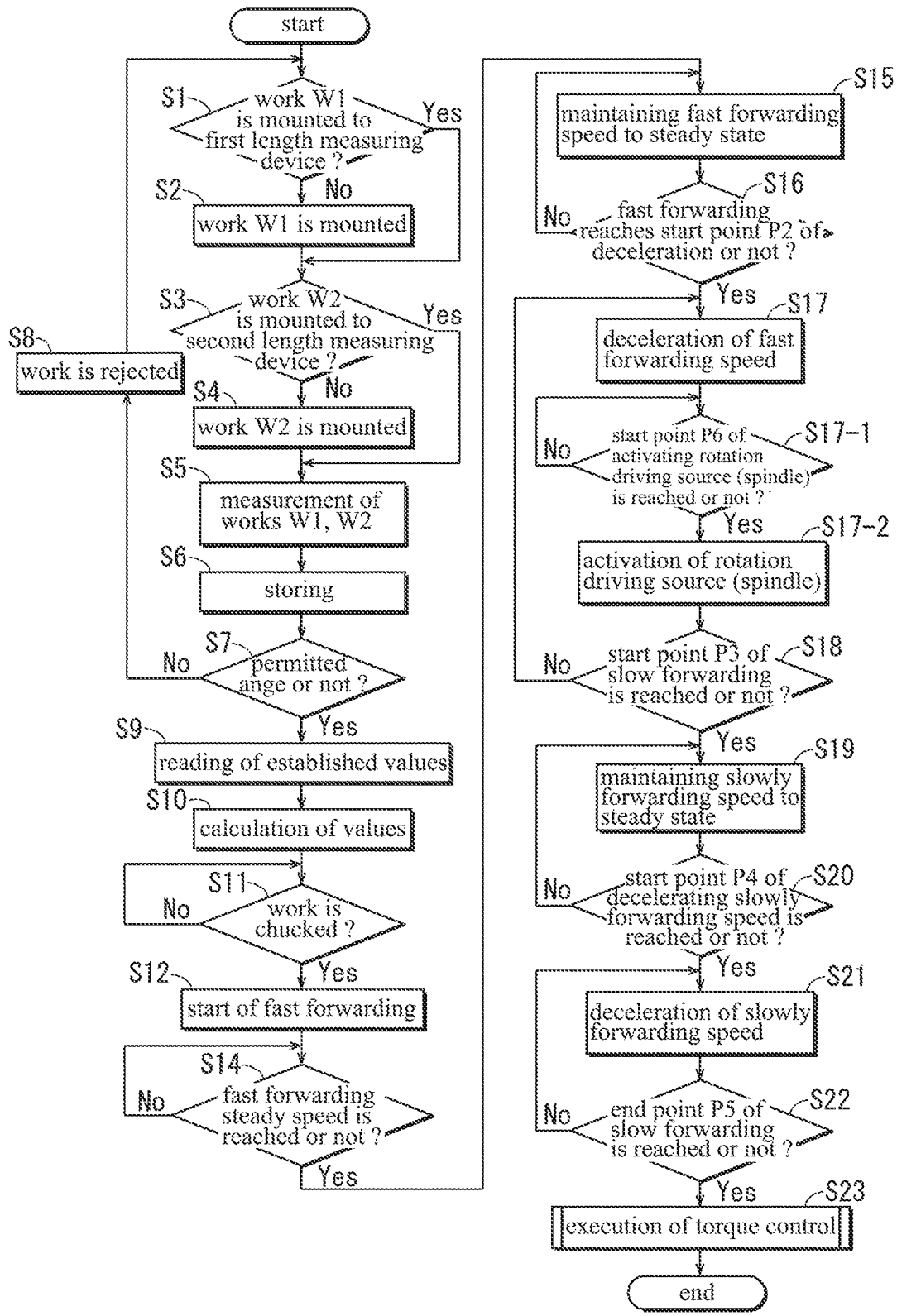
FIG. 8 A flowchart showing an example of control of the second embodiment.
Figure 10:
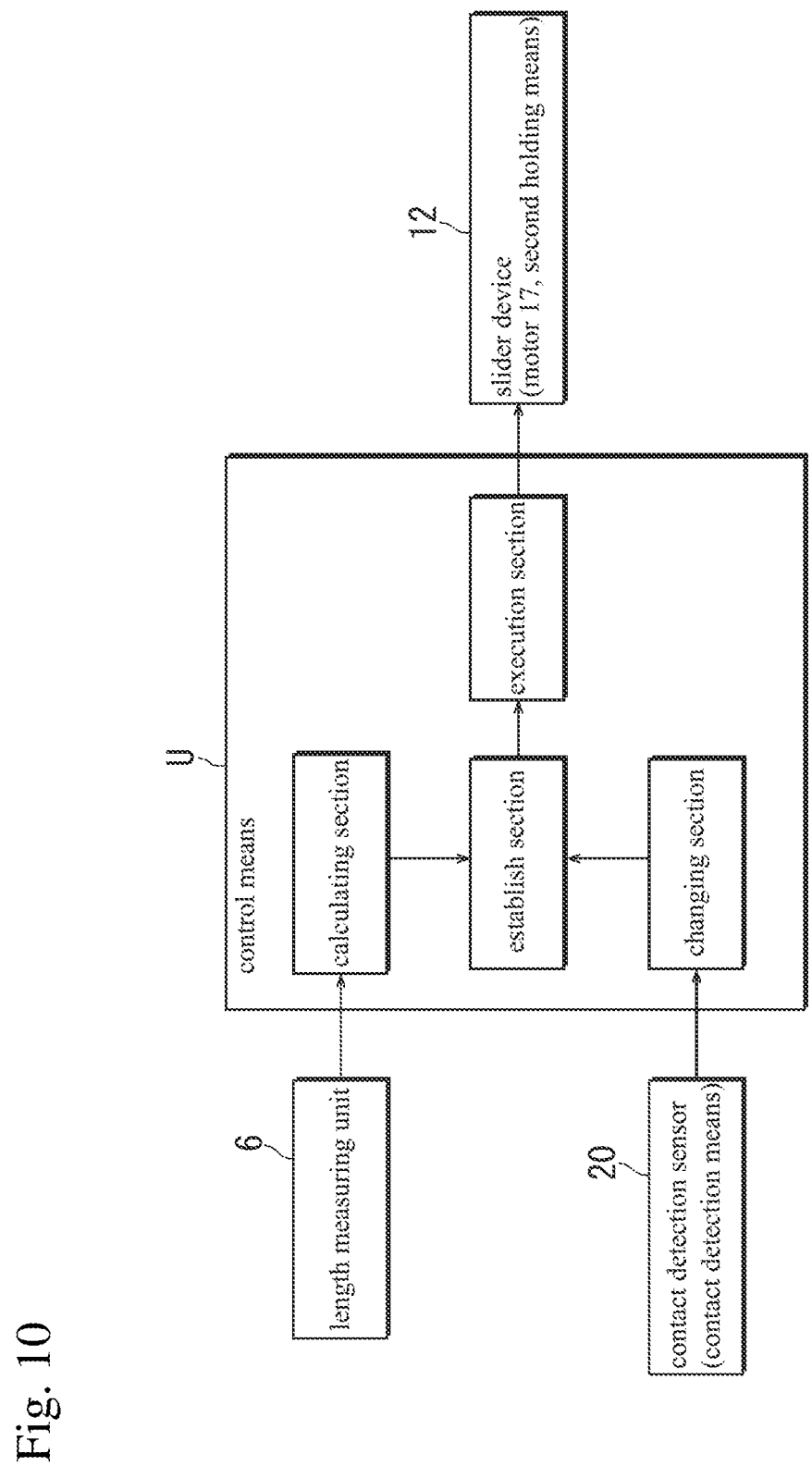
FIG. 10 A block diagram conceptually showing the control of the apparatus of friction welding of a third embodiment.
Figure 11:
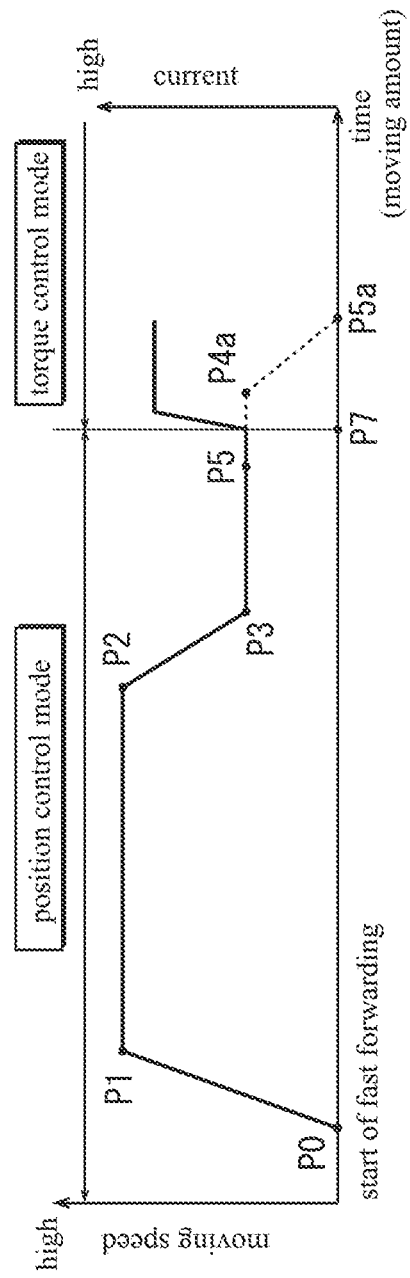
FIG. 11 An explanatory diagram showing the time course of the method of friction welding of the third embodiment.
Figure 12:
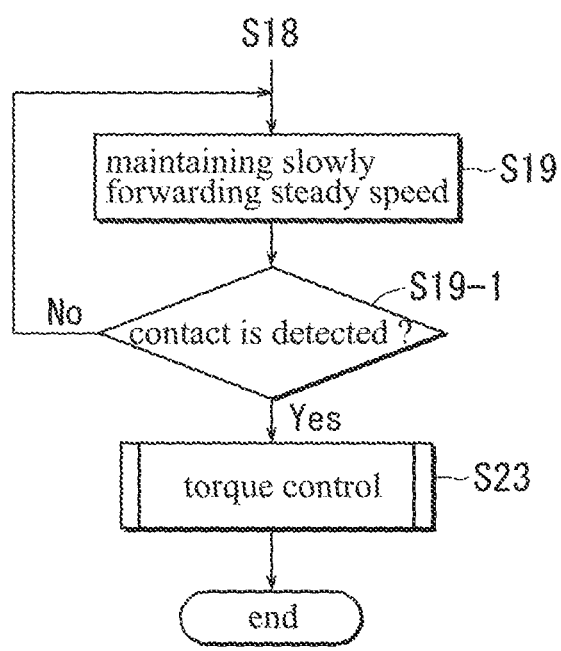
FIG. 12 A flowchart showing an example of control of the third embodiment.
Figure 13:
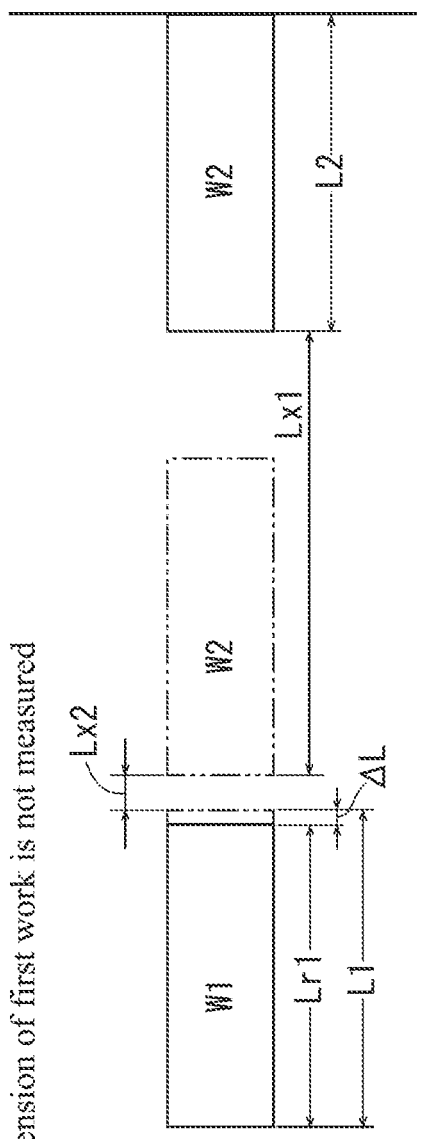
FIG. 13 An explanatory diagram conceptually showing the method of friction welding of a fourth embodiment.
Figure 14:
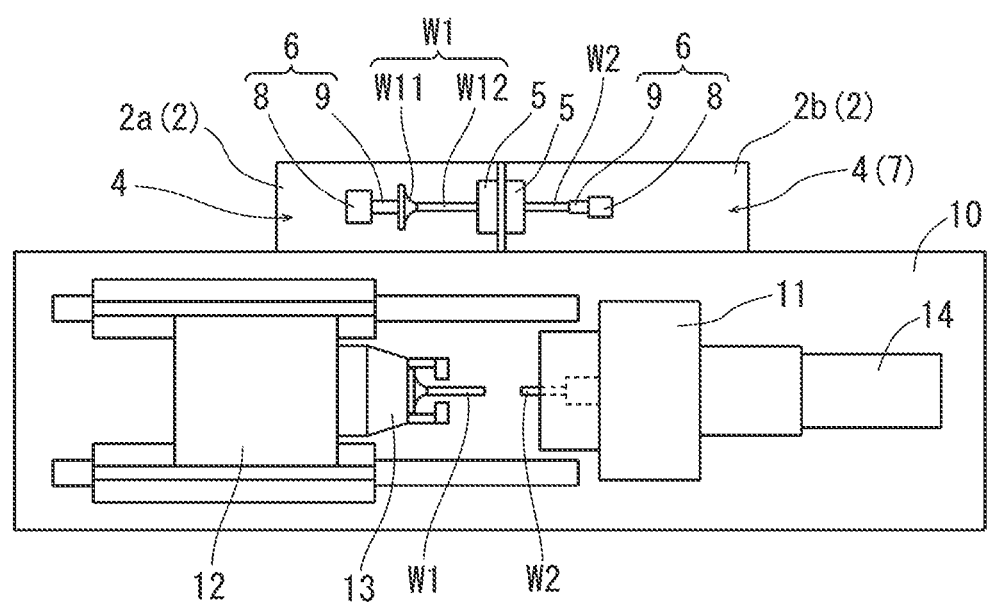
FIG. 14 An entire configuration showing an apparatus of friction welding of a fourth embodiment.

FIG. 7 and FIG. 8 show a second embodiment, FIG. 10 to FIG. 12 show a third embodiment, FIG. 13 shows a fourth embodiment and FIG. 14 shows a fifth embodiment. In the respective embodiments, the description of the configuration elements the same as those in the first embodiment will be omitted by attaching the same numerals thereto.

Second Embodiment

In the second embodiment shown in FIG. 7 and FIG. 8, the attention is paid to the fact that the front end of the second work W2 is always situated at a certain position with respect to the first work W1 at the slowly forwarding start point P3 in consideration that the slowly forwarding distance is a specified value (constant value) even if the dimension error is present in the work W, and a process of determining a rotation activation start point P6 of the rotation driving source (spindle) 14 of the spindle device 11 will be shown taking the slowly forwarding start point P3 as a reference point.

More concretely, as shown in FIG. 7, when the fast forwarding distance Lx1 is obtained by calculation, the slowly forwarding start point P3 is clarified accompanied therewith (the slowly forwarding start point P3 is also the fast forwarding end point), and the moving amount (time) from the slowly forwarding start point P3 to the slowly forwarding end point P5 is naturally determined. It can be judged that no problem arises in the rotation drive state (steady state) of the rotation driving source 14 when what extent the rotation activation start point P6 of the rotation driving source 14 of the spindle device 11 is established taking the slowly forwarding start point P3 as a reference point. In the present embodiment, the rotation driving source 14 is activated at the time before a length of time corresponding to the rising time of the rotation driving source 14 in consideration of the rising time of the rotation driving source 14 of the spindle device 11 taking the slowly forwarding start point P3 as a reference point.

On the other hand, the activation of the rotation driving source 14 of the spindle device 11 can be delayed as much as possible for suppressing the power consumption of the spindle device 11 as much as possible.

In this case, of course, the activation of the rotation driving source 14 may be started simultaneously with the reaching to the slowly forwarding start point P3. When a length of time from the slowly forwarding start point P3 to the slowly forwarding end point P5 is sufficiently longer than rising time of the rotation driving source 14, the rotation driving source 14 may be activated after the slowly forwarding start point P3 based on the condition that the rotation drive condition of the rotation driving source 14 is a steady state at the time of the slowly forwarding end point P5.

FIG. 8 shows a control example of the control unit U of FIG. 7. In this control example, while S13 is deleted in the flowchart of FIG. 6, the rotation activation start point P6 of the rotation driving source 14 of the spindle device 14 together with Lx1, is calculated based on the calculated fast forwarding end point P3 in S10. Between S17 and S18 in FIG. 6, at first, whether or not the rotation activation start point P6 of the rotation driving source 14 is judged by utilizing the rotation activation start point P6 calculated in S10 (S17-1). When P6 is judged to be reached, the rotation driving source 14 of the spindle device 11 is activated (S17-2). Thereby, the power consumption of the spindle device 11 can be suppressed as much as possible without arising a problem in the rotation drive state of the rotation driving source 14 of the spindle device 11.

Third Embodiment

A third embodiment shown in FIG. 10 to FIG. 13 is an alternative of the first and the second embodiments. In this third embodiment, as shown in FIG. 11, the execution of the slow forwarding continues even if the slow forwarding exceeds the specified slowly forwarding distance used for the calculation of the fast forwarding distance (slowly forwarding end point P5 in FIG. 11). On the other hand, when the first work W1 and the second work W2 get in contact with each other, the contact is detected by a contact sensor 20 acting as a contact detection means (P7 in FIG. 11) for finishing the slow forwarding, thereby immediately migrating to the torque control mode (in the present embodiment, immediately without any discontinuity).

Therefore, as shown in FIG. 10, the control unit U (control means) of the second embodiment includes an establish section acting as an establish means and a changing section acting as a changing means in addition to the above-mentioned calculating section (calculating means) for inputting the measured dimension signals of the works W1, W2 from the length measuring unit 6, and the execution section (execution means) outputting the control signals to the slider device 12.

The section receives the calculation results of the calculating section and establishes the control matters to be executed by the execution section. Specifically, in the establish section, the fast forwarding distance Lx1 calculated in the calculating section is established as the fast forwarding distance to be output to the slider device 12 (motor 17) by the execution section. As the slowly forwarding distance to be output to the slider device 12 (motor 17) by the execution section, not the specified the slowly forwarding distance Lx2 used for the calculation for the fast forwarding distance Lx1 in the calculating section, but a length (different from the former) sufficiently securing the contact between the pair of the works W1, W2 is established (refer to a broken line and P5a in FIG. 11). The length is such that the slowly forwarding steady speed is maintained in a relatively broader range including the point at which the pair of the works W1, W2 are in contact with each other. The changing section receives the contact signals of the works W1 and W2 from a contact detection sensor 20 acting as a contact detection means and, under this condition, changes the slowly forwarding distance established in the establish section (the change is finished), and enables the executing the control matters in the next step. In the present embodiment, when the changing section receives the contact signals of the works W1 and W2 from the contact detection sensor 20, the execution section immediately changes (or switches) the execution signal of the torque control to the matters which are able to be output.

The control example of the control unit U is shown in a flowchart of FIG. 12 which is obtained by changing the subjects from S18 to S23 in that of FIG. 6.

When the slowly forwarding start point is judged to be reached in S18, and the slowly forwarding steady speed is maintained in S19, whether or not the works W1, W2 get in contact with each other in the next S19-1. When S19-1 is judged to be NO, return to S19 for continuing the slow forwarding. Of course, in this stage, even if the distance exceeds a specified slowly forwarding distance used for the calculation of the fast forwarding distance Lx1 (passing through P5), the executions of S19 and S19-2 are repeated unless the works W1, W2 get in contact with each other. On the other hand, when the judgment of S19-1 is YES, we may go to S23 for immediately executing the torque control.

Accordingly, in this third embodiment, the first work W1 can be in contact with the second work W2 without fail under the slow forwarding. This contact assuredly completes the slow forwarding for smoothly bringing the system to the next torque control mode. Accordingly not only the assuredness of preventing the damages of the work W1, W2 is increased, but also the smooth migration to the torque control mode can be performed.

Fourth Embodiment

A fourth embodiment shown in FIG. 13 presents the measurement of only the dimension of the second work W2.

In this fourth embodiment, the dimension L1 of the first work W1 is deemed to be a total between its legitimate length Lr1 and a safety additional dimension ΔL (for example, the longest scheduled dimension error when the dimension is longer than the legitimate dimension), and on the other hand, the actual dimension L2 of the second work W2 is measured. Based on the deemed dimension L1 of the first work W1 and the dimension measurement result of the second work W2, the fast forwarding distance Lx for the fast forwarding is calculated in accordance with the above-mentioned expression under the condition that the slowly forwarding distance Lx 2 for the slow forwarding is constant.

Thereby, when the dimension errors are generated in the pair of the works W1, W2, the relative proportion of the fast forwarding distance Lx1 can be increased by reducing the above slowly forwarding distance Lx2 as much as possible so as to reduce also the slowly forwarding distance Lx2+ΔL actually executed Also in this case, a length of time required for the production of one product (cycle time (time/product)) can be reduced for increasing the productivity regardless of the dimension errors of the works W1, W2.

The measurement of only the second work W2 is sufficient so that the required length measuring device 2 can be made simpler.

In this fourth embodiment, similarly to the above third embodiment, the specified slowly forwarding distance Lx2 for calculating the fast forwarding distance Lx1 is not employed, and the slow forwarding continues until the contact between the works W1, W2. Then, the migration to the torque control mode is conducted under the condition of the detection of the contact between the works W1, W2 by the contact detection sensor 20.

Fifth Embodiment

A fifth embodiment shown in FIG. 14 presents the modification of the positional arrangement of the respective elements of the apparatus of friction welding 1.

In the fifth embodiment, with regard to the first length measuring apparatus 2a, the length measuring unit 6 is placed on the flat placing surface 7 of the measuring stand 4 on its one side along the longitudinal direction (left-hand side in FIG. 14), and the stopper 5 is placed on the flat placing surface 7 of the measuring stand 4 on the other side along the longitudinal direction (right-hand side in FIG. 14). On the other hand, with regard to the second length measuring apparatus 2b similarly to the first embodiment, the stopper 5 is placed on the flat placing surface 7 of the measuring stand 4 on its one side along the longitudinal direction (left-hand side in FIG. 14), and the length measuring unit 6 is placed on the flat placing surface 7 of the measuring stand 4 on the other side along the longitudinal direction (right-hand side in FIG. 4.

With regard to the bonding device 3, the slider device 12 is placed on the top surface of the main frame 10 on its one side along the longitudinal direction (left-hand side in FIG. 14), and the spindle device 11 is placed on the top surface of the main frame 10 on the other side along the longitudinal direction (right-hand side in FIG. 14). The work W1 acting as the head-shaped element can be chucked to the slider device 12, and the work W2 acting as the shaft-shaped element can be chucked to the spindle device 11 such that the work W1 approaches the work W2.

This configuration can exert functions similar to those of the first embodiment by modifying the positional arrangement of the respective elements. The description of the elements the same as those in the first element is omitted by attaching the same numerals thereto.

While the embodiments of the present invention have been described, the following aspects are included in the present invention.

(1) To enable the movement of the spindle decide 11 in addition to the slider device 12 so as to permit the relative approach and separation between the devices 11, 12.

(2) To mount the rotation driving source for rotating the work (shaft-shaped element) W2 in the slider decide 12 in addition to the spindle device 11 so as to establish the relative rotational relation between the works W1, W2 by means of the rotation driving sources.

(3) The order of setting the works W1, W2 to the length measuring devices 2a, 2b, and the orders of setting the works W1, W2 to the spindle device 11 and the slider device 12 can be determined arbitrarily.

DESCRIPTION OF SYMBOLS

1 . . . apparatus of friction welding
2 . . . length measuring device
6 . . . length measuring unit
11 . . . spindle device (first holding device)
12 . . . slider device (second holding device)
14 . . . rotation driving source section (rotation driving source)
17 . . . drive motor
20 . . . contact detection sensor (contact detection means)
Lx1 . . . fast forwarding distance
P0 . . . fast forwarding start point
P3 . . . slowly forwarding start point
P6 . . . activation start point of rotation driving section
W1 . . . first work (head-shaped element)

W2 . . . second work (shaft-shaped element)
L1 . . . dimension of first work
Lr1 . . . legitimate length of first work
ΔL . . . safety additional dimension
L2 . . . dimension of second work
U . . . control unit (control means)

The invention claimed is:

1. A method of friction welding in which a first work and a second work are driven to approach each other for their bonding, the method comprising steps of:
   (a) providing an apparatus including:
      (i) at least one length measuring unit which measures dimensions (L1, L2) of the first work and the second work,
      (ii) first and second holding devices which are positioned in a relatively-approachable fashion in a drive approach of the first and the second works while holding the first work and the second work, and which dispose the first work and the second work such that a constant distance (L0+LS) between opposite outer ends of the both works is kept before the drive approach, and
      (iii) a control unit for controlling at least one of the first and the second holding devices to generate a relative approach between the second work held by the second holding device and the first work held by the first holding device by means of a fast forwarding aspect and a slowly forwarding aspect that follows the fast forwarding aspect and proceeds at a speed slower than that of the first forwarding aspect, wherein the control unit calculates the fast forwarding distance (Lx1) for the fast forwarding aspect based on the measured results (L1, L2) of the length measuring unit under a condition of the constant slowly forwarding distance (Lx2) for the slowly forwarding aspect;
   (b) with the at least one length measuring unit, measuring respective dimensions (L1, L2) of the first work and the second work;
   (c) with the control unit, calculating the fast forwarding distance (Lx1) for the fast forwarding aspect by using a result of the measured dimensions (L1, L2) of the both works under a condition of a constant slowly forwarding distance (Lx2) for the slowly forwarding aspect; and
   (d) based on said calculating in said step (c), after holding of the first and the second works, respectively, by the first and the second holding devices, respectively, relatively approaching the first work held by the first holding device and the second work held by the second holding device in the slowly forwarding aspect after the first work and the second work have approached the slowly forwarding distance (Lx2), while relatively-approaching the first work and the second work in the fast forwarding aspect before the works have approached the slowly forwarding distance (Lx2),
   whereby a proportion of the fast forwarding aspect to an entire forwarding aspect is increased for shorter first and second works.

2. The method of friction welding as claimed in claim 1, further including decelerating the speed of the slowly forwarding aspect lower than a steady speed of the above slowly forwarding aspect, for the contact between the first work and the second work.

3. The method of friction welding as claimed in claim 1, wherein the first work and the second work are relatively rotated by using a rotation driving source for the bonding between the first work and the second work, and the rotation driving source is activated after a start point of the fast forwarding aspect and at least before an activation start point of the rotation driving source which makes the relatively rotation state into a steady state by an end point of the slowly forwarding aspect.

4. The method of friction welding as claimed in claim 3, wherein the activation start point of the rotation driving source is calculated by said control unit based on the start point of the slowly forwarding aspect as a reference.

5. A method of friction welding in which a first work and a second work are driven to approach each other for their bonding, the method comprising the steps of:
   (a) providing an apparatus including:
      (i) a length measuring unit which measures a dimension (L2) of the second work;
      (ii) first and second holding devices which are positioned in a relatively-approachable fashion in a drive approach of the first and the second works while holding the first work and the second work, and which dispose the first work and the second work such that a constant distance (L0+LS) between opposite outer ends of the both works is kept before the drive approach, and
      (iii) a control unit for controlling at least one of the first and the second holding devices to generate a relative approach between the second work held by the second holding device and the first work held by the first holding device by means of a fast forwarding aspect and a slowly forwarding aspect that follows the first forwarding aspect and proceeds at a speed slower than that of the first forwarding aspect, wherein the control unit calculates the first forwarding distance (Lx1) for the fast forwarding aspect under a condition of the constant slowly forwarding distance (Lx2) for the slowly forwarding aspect and on the premise that the dimension (L1) of the first work is deemed to be addition of a regular dimension (Lr1) of the first work with a specified spare dimension (ΔL), based on the deemed dimension of the first work (Lr1+ΔL) and the measured result of the second work (L2);
   (b) with the length measuring unit, measuring the dimension (L2) of the second work, while the dimension (L1) of the first work is deemed to be the addition (Lr1+ΔL) of the regular dimension (Lr1) of the first work with the specified spare dimension (ΔL);
   (c) with the control unit, calculating the fast forwarding distance (Lx1) for the fast forwarding aspect by using a result of the deemed dimension (Lr1+ΔL) and the measured dimension (L2) of the second work under a condition of the constant slowly forwarding distance (Lx2) for the slowly forwarding aspect; and
   (d) based on said calculating in said step (c), after holding of the first and the second works, respectively, by the first and the second holding devices, respectively, relatively approaching the first work held by the first holding device and the second work held by the second holding device in the slowly forwarding aspect after the first work and the second work have approached the slowly forwarding distance (Lx2), while relatively-approaching the first work and the second work in the fast forwarding aspect before the works have approached the slowly forwarding distance (Lx2),
   whereby a proportion of the fast forwarding aspect to an entire forwarding aspect is increased for shorter first and second works.

6. The method of friction welding as claimed in claim 1, further including continuing the execution of the slowly forwarding aspect even in the event that this aspect exceeds the above specified slowly forwarding distance, and, on the other hand, completing the slowly forwarding aspect when the first work gets in contact with the second work.

7. The method of friction welding as claimed in claim 1, further including making into a target work only a work having a measured dimension value in a permitted range based on the dimension measured results of the works.

8. An apparatus of friction welding, comprising:
at least one length measuring unit which measures dimensions (L1, L2) of a first work and a second work to be joined;
first and second holding devices which are positioned in a relatively-approachable fashion in a drive approach of the first and the second works while holding the first and the second work, and which dispose the first work and the second work such that a constant distance (L0+LS) between opposite outer ends of the both works is kept before the drive approach; and
a control unit which generates a relative approach between the first work held by the first holding device and the second work held by the second holding device by drive-controlling at least one of the first holding device and the second holding device by means of a fast forwarding aspect and a slowly forwarding aspect of which a slowing forwarding speed is slower than that of the fast forwarding aspect and follows the fast forwarding aspect,
wherein the control unit has:
an information holding section for holding the constant distance (L0+LS) and the constant slowly forwarding distance (Lx2) for the slowly forwarding aspect;
a calculation section calculating a fast forwarding distance (Lx1) for the fast forwarding aspect based on a result of the dimensions (L1, L2) of the length measuring unit and on the information (L0+LS, Lx2) held in the information holding section; and
an execution control section adapted to:
output a drive control signal to at least one of the first holding device and the second holding device to relatively approach the first and the second works;
relatively approach the first and the second work in the fast forwarding aspect based on a fast forwarding distance (Lx1) calculated by the calculation section; and then
relatively approach the first and the second works in the slowly forwarding aspect when the distance between the first and the second work is reduced to the slowly approaching distance (Lx2).

9. The apparatus of friction welding as claimed in claim 8, wherein the control unit is configured to make the speed of the slowly forwarding aspect into a deceleration speed slower than a steady speed of the slowly forwarding aspect for the contact between the first work and the second work.

10. The apparatus of friction welding as claimed in claim 8, wherein the first holding device includes a rotation driving source for rotating the first work, and the control unit is configured to activate the rotation driving source after a start point of the fast forwarding aspect and at least before an activation start point of the rotation driving source which makes the relatively rotation state of the rotation driving source into a steady state by an end point of the slowly forwarding aspect.

11. An apparatus of friction welding, comprising:
at least one length measuring unit which measures a dimension (L2) of a second work to be joined with a first work;
first and second holding devices which are positioned in a relatively-approachable fashion in a drive approach of the first and the second works while holding the first and the second work, and which dispose the first work and the second work such that a constant distance (L0+LS) between opposite outer ends of the both works is kept before the drive approach; and
a control unit which generates a relative approach between the first work held by the first holding device and the second work held by the second holding device by drive-controlling at least one of the first holding device and the second holding device by means of a fast forwarding aspect and a slowly forwarding aspect of which a slowing forwarding speed is slower than that of the fast forwarding aspect and follows the fast forwarding aspect,
wherein the control unit has:
an information holding section for holding information to be read in regarding a deemed dimension (Lr1+ΔL) of the first work obtained by addition of a regular dimension (Lr1) of the first work with a specified spare dimension (ΔL) along with the constant distance (L0+LS), and the constant slowly forwarding distance (Lx2) for the slowly forwarding aspect;
a calculation section calculating a fast forwarding distance (Lx1) for the fast forwarding aspect based on a result of the deemed dimension (Lr1+ΔL) of the first work, a measurement result (L2) of the length measuring unit, and the information (L0+LS, Lx2) held in the information holding section; and
an execution control section adapted to:
output a drive control signals to at least one of the first holding device and the second holding device to relatively approach the first and the second works;
relatively approach the first and the second work in the fast forwarding aspect based on a fast forwarding distance (Lx1) calculated by the calculation section; and then
relatively approach the first and the second works in the slowly forwarding aspect when the distance between the first and the second work is reduced to the slowly approaching distance (Lx2).

12. The apparatus of friction welding as claimed in claim 8,
wherein a contact detection sensor is mounted for detecting the contact between the first work and the second work; and
the control unit includes:
an establish section configured to establish an execution distance for executing the slowly forwarding aspect which is deemed to continue exceeding the specified slowly forwarding distance together with establishing an execution distance for executing the fast forwarding aspect as the fast forwarding distance based on the calculation results of the calculation section;
an execution section configured to execute the relative approach between the second holding device and the first holding device based on the establishment of the establish section; and
a changing section configured to complete the execution of the slowly forwarding aspect by means of changing an established content in the establish section when the first work and the second work are judged to be in contact with each other based on the detection results of the above contact detection sensor.

13. The apparatus of friction welding as claimed in claim 11, wherein the first holding device includes a rotation driving source for rotating the first work, and the control unit is configured to activate the rotation driving source after a start point of the fast forwarding aspect and at least before an activation start point of the rotation driving source which makes the relatively rotation state of the rotation driving source into a steady state by an end point of the slowly forwarding aspect.

14. The apparatus of friction welding as claimed in claim 11,
wherein a contact detection sensor is mounted for detecting the contact between the first work and the second work; and
the control unit includes:
an establish section configured to establish an execution distance for executing the slowly forwarding aspect which is deemed to continue exceeding the specified slowly forwarding distance together with establishing an execution distance for executing the fast forwarding aspect as the fast forwarding distance based on the calculation results of the calculation section;
an execution section configured to execute the relative approach between the second holding device and the first holding device based on the establishment of the establish section; and
a changing section configured to complete the execution of the slowly forwarding aspect by means of changing an established content in the establish section when the first work and the second work are judged to be in contact with each other based on the detection results of the above contact detection sensor.

15. The method of friction welding as claimed in claim 5, wherein the first work and the second work are relatively rotated by using a rotation driving source for the bonding between the first work and the second work, and the rotation driving source is activated after a start point of the fast forwarding aspect and at least before an activation start point of the rotation driving source which makes the relatively rotation state into a steady state by an end point of the slowly forwarding aspect.

16. The method of friction welding as claimed in claim 15, wherein the activation start point of the rotation driving source is calculated by said control unit based on the start point of the slowly forwarding aspect as a reference.

17. The method of friction welding as claimed in claim 5, further including continuing the execution of the slowly forwarding aspect even in the event that this aspect exceeds the above specified slowly forwarding distance, and, on the other hand, completing the slowly forwarding aspect when the first work gets in contact with the second work.

18. The method of friction welding as claimed in claim 5, further including making into a target work only a work having a measured dimension value in a permitted range based on the dimension measured results of the works.

19. The apparatus of friction welding according to claim 8, wherein the control unit has:
a fast-forwarding instruction section for instructing the execution control section an execution of the fast forwarding aspect on the premise that an initiation condition for a relative approach of the first and the second work is satisfied; and
a slowly-forwarding instruction section for instructing the execution control section an execution of the slowly forwarding aspect based on a determination made that the distance between the first and the second works is reduced to the slowly forwarding distance (Lx2) in the fast forwarding aspect instructed by the fast-forwarding instruction section.

* * * * *